(12) United States Patent
Unno et al.

(10) Patent No.: US 10,844,904 B2
(45) Date of Patent: Nov. 24, 2020

(54) WORKPIECE TRANSPORT CONTROL SYSTEM AND MOTION GUIDANCE DEVICE

(71) Applicant: THK CO., LTD., Tokyo (JP)

(72) Inventors: Akihiro Unno, Tokyo (JP); Yuki Hayashi, Tokyo (JP); Yuki Tanaka, Tokyo (JP); Tomofumi Ohashi, Tokyo (JP); Yusuke Asano, Tokyo (JP); Katsunori Kogure, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/480,095

(22) PCT Filed: Jan. 16, 2018

(86) PCT No.: PCT/JP2018/000960
§ 371 (c)(1),
(2) Date: Jul. 23, 2019

(87) PCT Pub. No.: WO2018/139261
PCT Pub. Date: Aug. 2, 2018

(65) Prior Publication Data
US 2019/0376553 A1    Dec. 12, 2019

(30) Foreign Application Priority Data

Jan. 24, 2017   (JP) ................................ 2017-010617

(51) Int. Cl.
*F16C 29/06*   (2006.01)

(52) U.S. Cl.
CPC .................................. *F16C 29/06* (2013.01)

(58) Field of Classification Search
CPC ............. B65G 25/04; G05D 3/12; F16C 29/06
See application file for complete search history.

(56) References Cited

U.S. PATENT DOCUMENTS 4,810,941 A * 3/1989 Ohishi ................. G05B 19/232
                                                        318/592
6,074,329 A * 6/2000 Hirano ............. G05B 19/41815
                                                        198/346.1
(Continued)

FOREIGN PATENT DOCUMENTS

JP      3-114914 A     5/1991
JP      2000-99151 A   4/2000
(Continued)

OTHER PUBLICATIONS

International Search Report dated Mar. 6, 2018, issued in counterpart International Application No. PCT/JP2018/000960, with English Translation. (4 pages).

*Primary Examiner* — Vincent H Tran
(74) *Attorney, Agent, or Firm* — Westerman, Hattori, Daniels & Adrian, LLP

(57) ABSTRACT

To suitably set a control gain in feedback control while suppressing an increase in apparatus size. A workpiece transport control system includes: one or a plurality of motion guidance devices; a table on which a workpiece is to be placed; an actuator which imparts a driving force to the table; a control unit which performs transport control by feedback control; and a calculation unit which calculates a transport load applied from the workpiece to a moving member of each of the one or a plurality of motion guidance devices, wherein a control gain related to the feedback control in the transport control is adjusted on the basis of the transport load in each of the one or a plurality of motion guidance devices.

7 Claims, 13 Drawing Sheets

(56) References Cited

U.S. PATENT DOCUMENTS

| | | | | |
|---|---|---|---|---|
| 6,200,031 B1* | 3/2001 | Faulhaber | ............... | B23Q 1/40 384/45 |
| 2001/0007961 A1* | 7/2001 | Kano | ................... | B65G 43/08 700/230 |
| 2004/0070358 A1* | 4/2004 | Yamada | ................. | F16F 15/18 318/560 |
| 2005/0082945 A1* | 4/2005 | Chou | ...................... | H02N 2/08 310/328 |
| 2005/0251985 A1* | 11/2005 | Arntson | ................ | B23B 39/18 29/407.05 |
| 2010/0031856 A1* | 2/2010 | Shoda | ................... | B60L 5/005 108/21 |
| 2015/0036953 A1* | 2/2015 | Wada | ................ | F16O 29/0609 384/44 |

FOREIGN PATENT DOCUMENTS

| | | |
|---|---|---|
| JP | 2009-124803 A | 6/2009 |
| JP | 2015-230508 A | 12/2015 |

* cited by examiner

[Fig. 1]
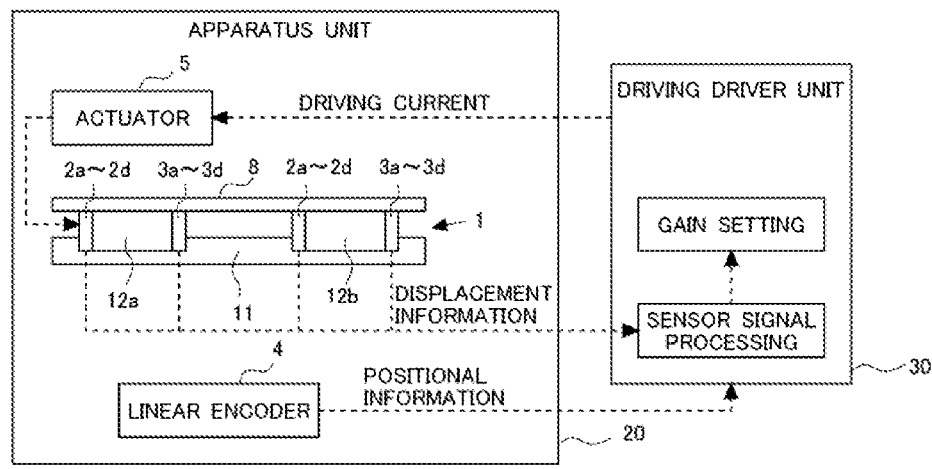

[Fig. 2]
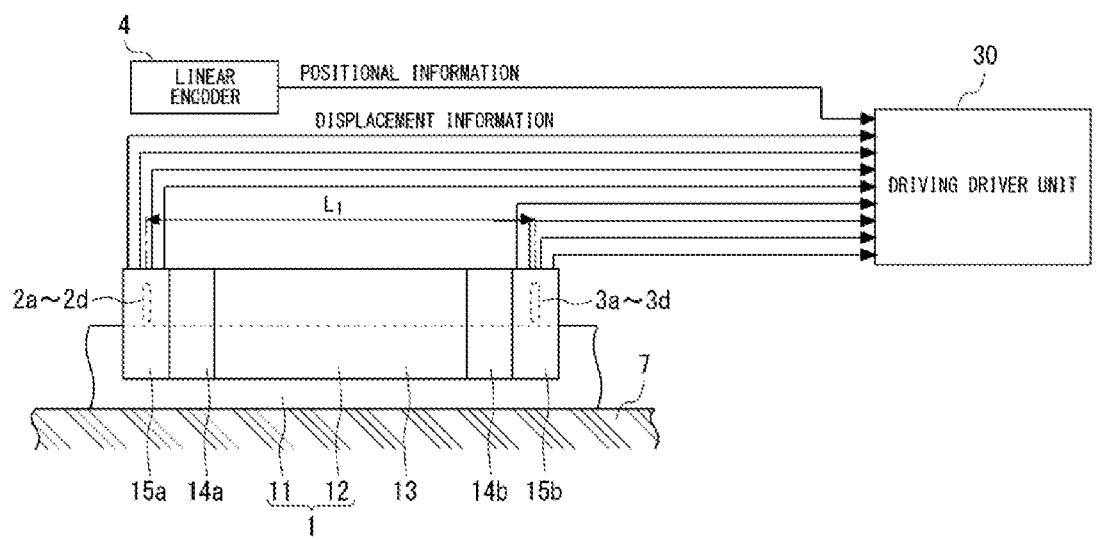

[Fig. 3]
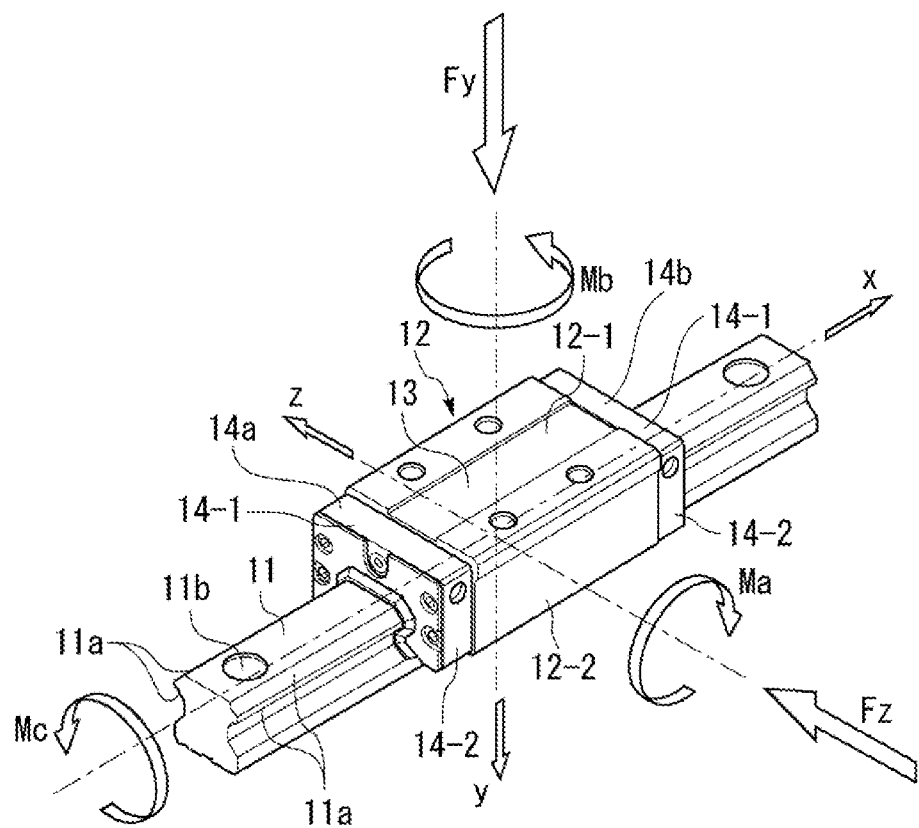

[Fig. 4]
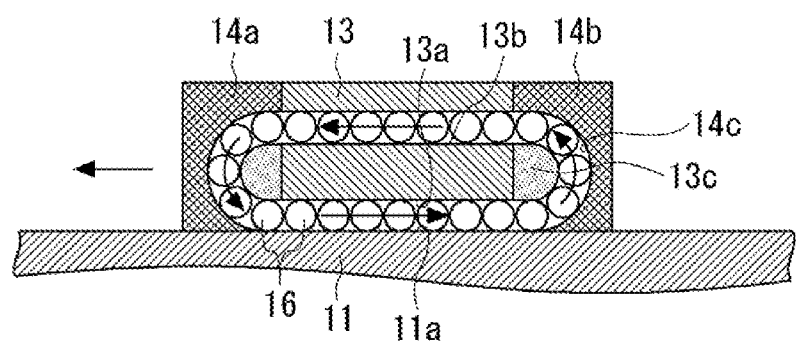

Fig. 5 ( a )
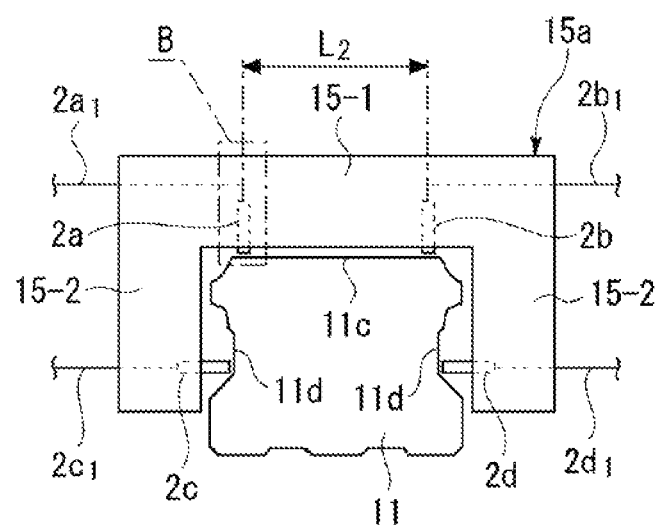
Fig. 5 ( b )
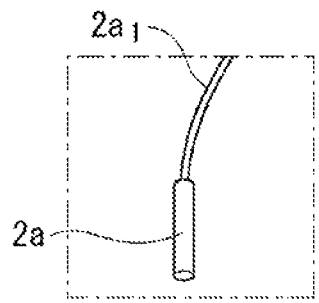
ENLARGED VIEW OF PART B

[Fig. 6]
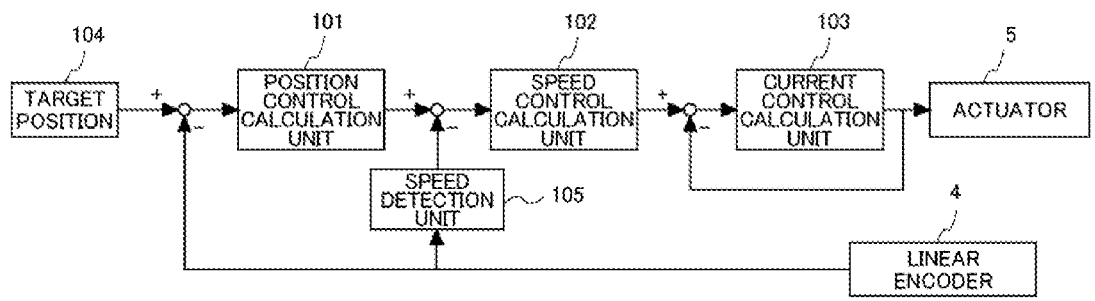

[Fig. 7]
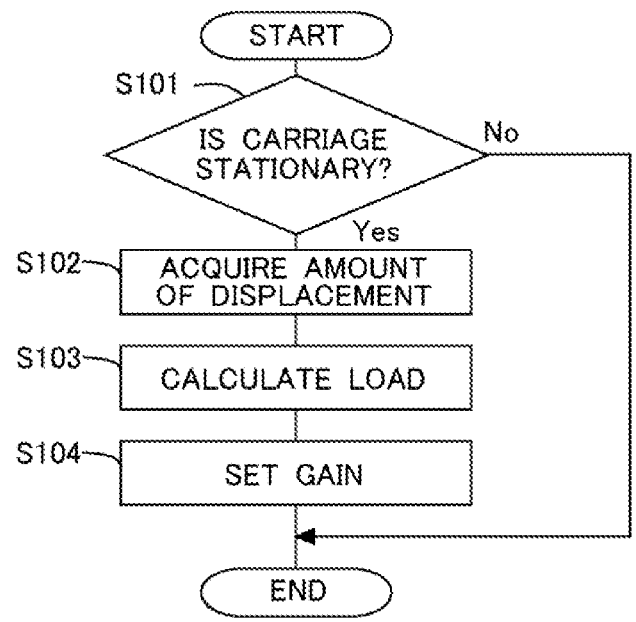

[Fig. 8]
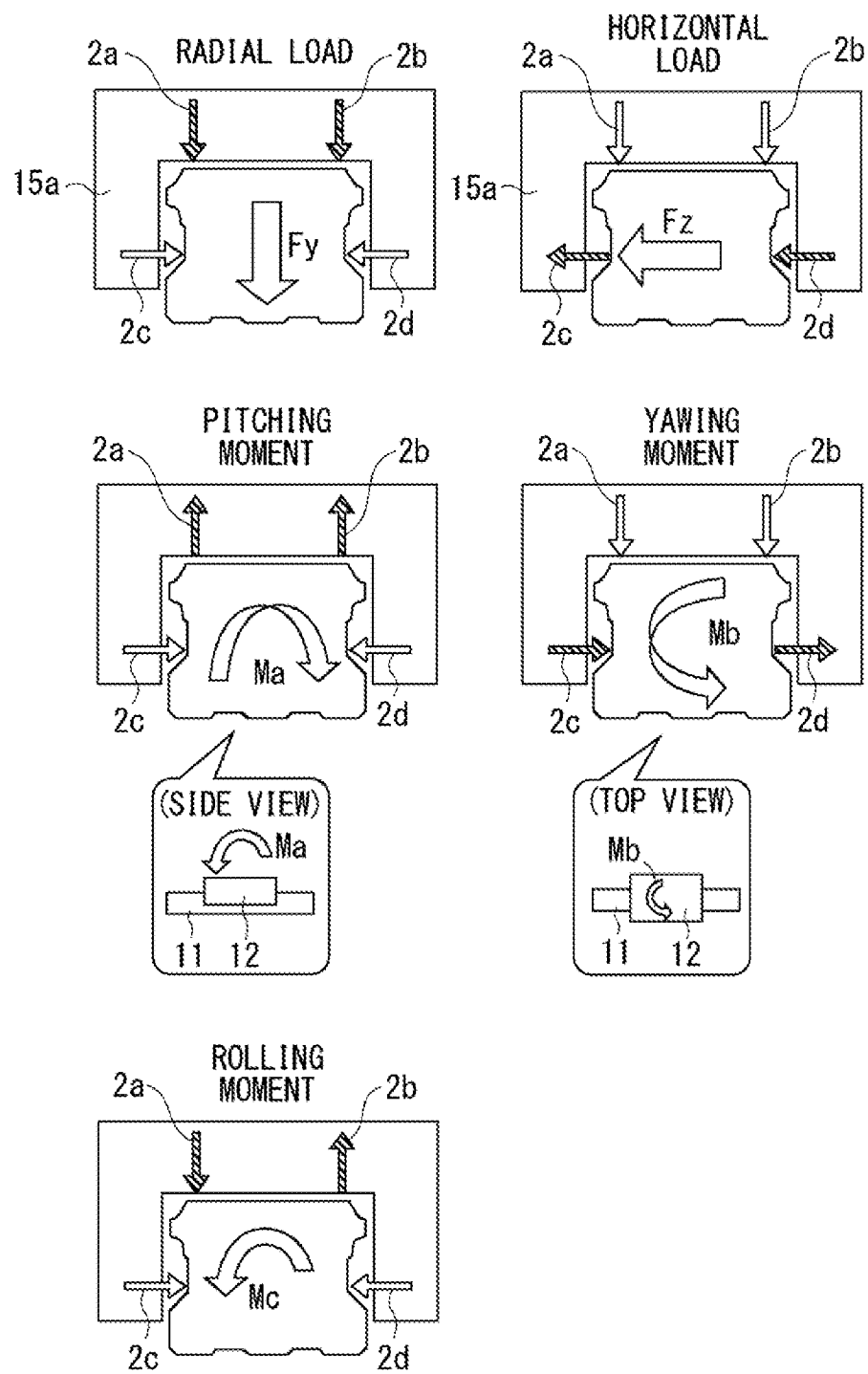

[Fig. 9]
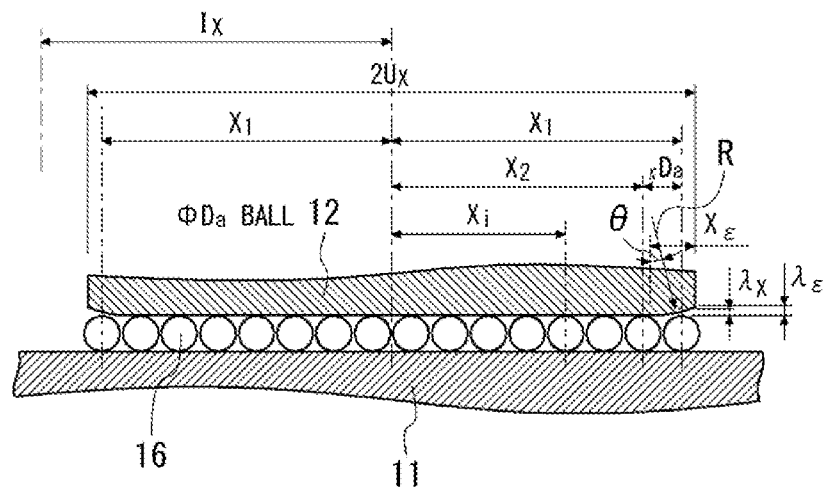

[Fig. 10]
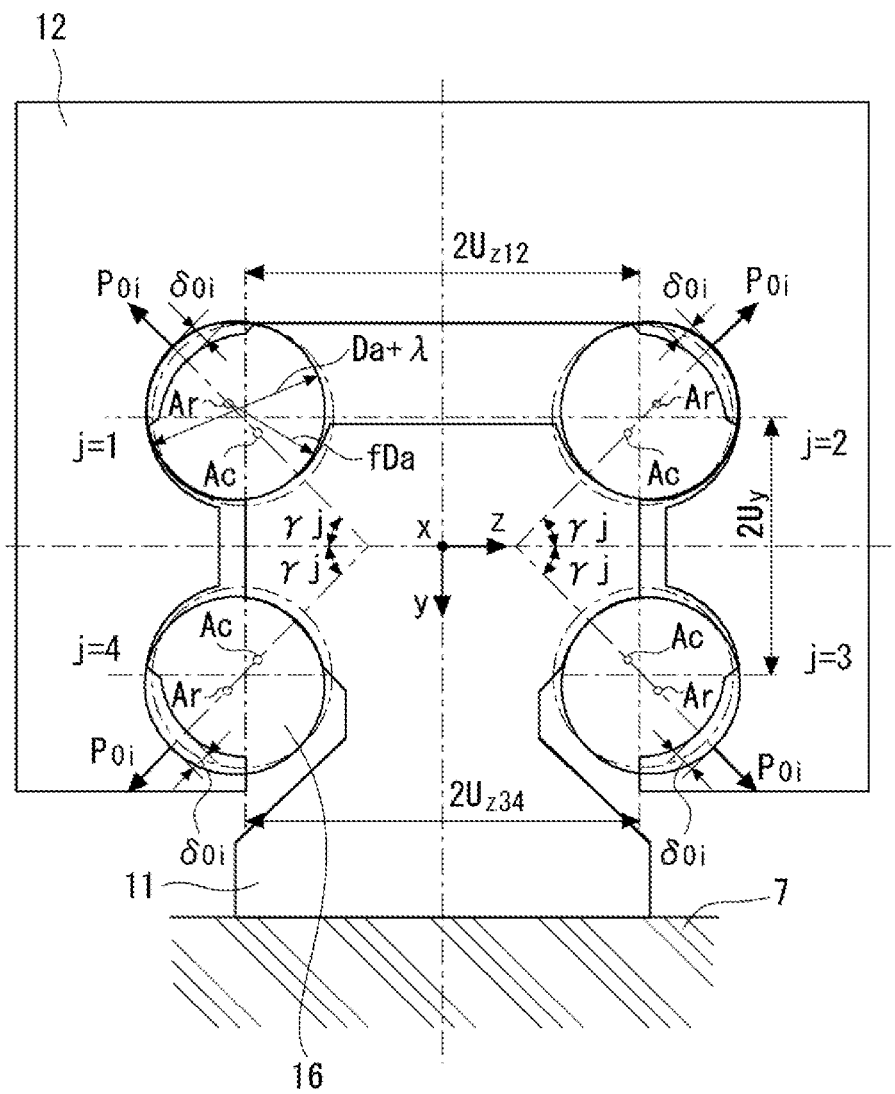

[Fig. 11]
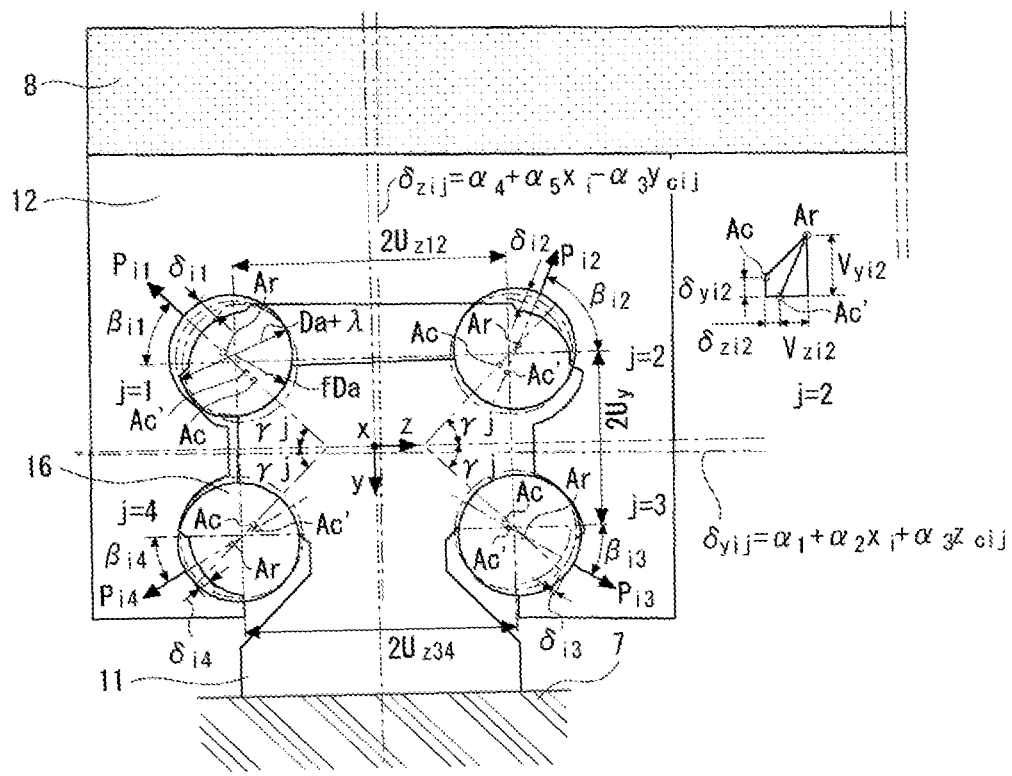

[Fig. 12]
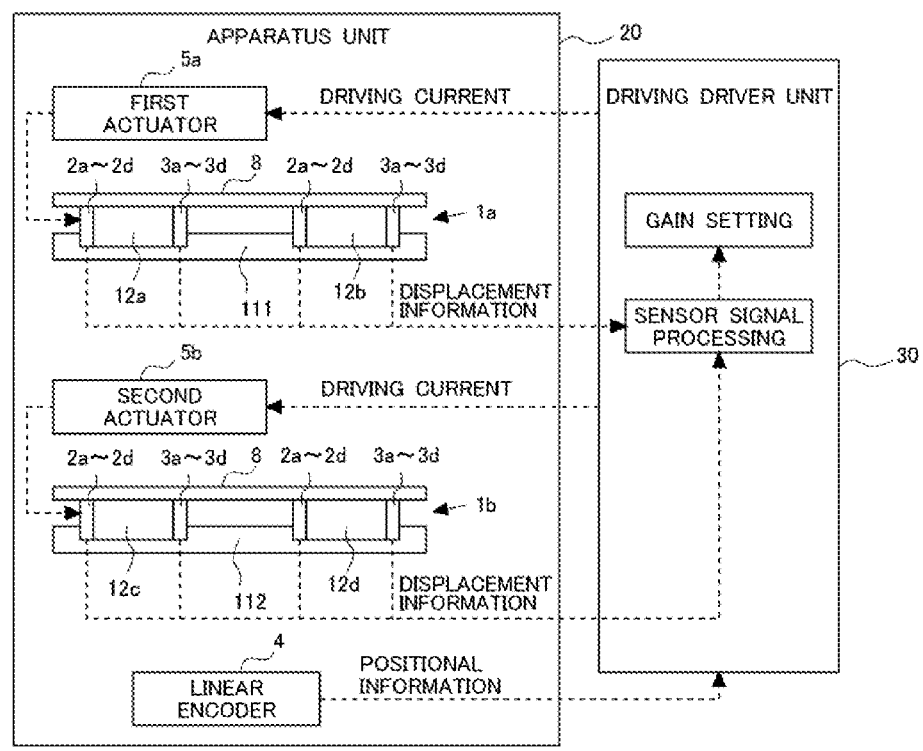

[Fig. 13]
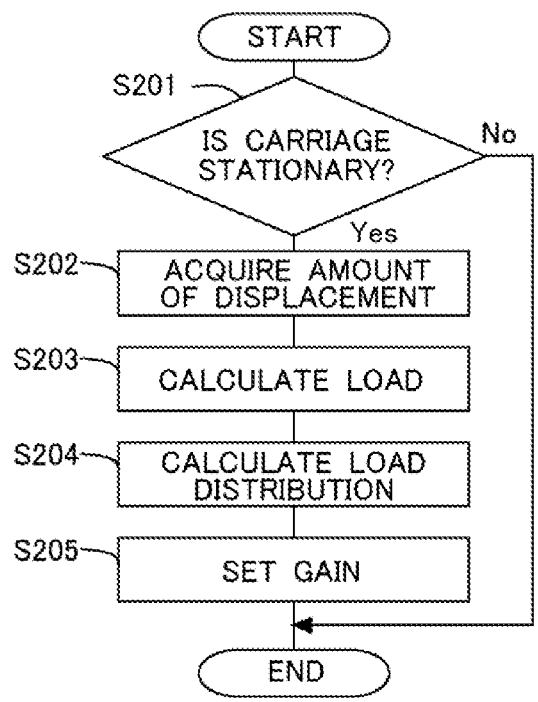

WORKPIECE TRANSPORT CONTROL SYSTEM AND MOTION GUIDANCE DEVICE

TECHNICAL FIELD

The present invention relates to a workpiece transport control system which transports a workpiece while movably supporting the workpiece using a motion guidance device having a track member and a moving member, and to a motion guidance device used in the workpiece transport control system.

BACKGROUND ART

In a servomechanism, feedback control on the basis of a position of a moving member or the like is performed. In order to reduce transport time of a workpiece, setting an optimal control gain in the feedback control is important. In a line that transports a workpiece, an optimal value of the control gain may differ between a section in which the workpiece is transported and an empty load section in which the workpiece is not loaded due to a difference in loads acting on the moving member. To deal with such a situation, either a common control gain applicable in both sections is set or control gains set in advance to the respective sections are switched. In addition, a control gain during feedback control is selected from a plurality of combinations (for example, refer to PTL 1). Furthermore, a control gain is automatically adjusted.

CITATION LIST

Patent Literature

[PTL 1] Japanese Patent Application Laid-open No. 2009-124803

SUMMARY OF INVENTION

Technical Problem

When automatically adjusting a control gain, the moving member must be actually moved. Therefore, since a control gain cannot be obtained in advance before the moving member starts moving, a transport time of a workpiece is prolonged. In addition, with the method of switching control gains, since a mass of a workpiece must be known in advance, it is difficult to accommodate a wide variety of workpieces. Furthermore, when selecting a control gain from a plurality of combinations of control gains, since there is a limit to the number of gains that can be set, the number of types of workpieces that can be accommodated is also limited. Moreover, while a method of measuring a mass of a workpiece using a load cell and setting a control gain based on the mass is also conceivable, since a load cell is relatively large, there is a risk that the load cell ends up increasing a size of the system.

The present invention has been made in consideration of the problems described above and an object thereof is to provide a technique for suitably setting a control gain in feedback control while suppressing an increase in apparatus size.

Solution to Problem

In order to solve the problems described above, the present invention adopts a configuration which calculates a transport load of a motion guidance device and adjusts a control gain on the basis of the transport load. Specifically, the present invention is a workpiece transport control system which transports a workpiece while movably supporting the workpiece using a motion guidance device having a track member which extends along a longitudinal direction and a moving member which is arranged so as to oppose the track member via a rolling element rollably arranged inside a rolling groove and which is relatively movable along the longitudinal direction of the track member, the workpiece transport control system including: one or a plurality of motion guidance devices; a transport table which is a table on which the workpiece is to be placed, the transport table being supported by the one or a plurality of motion guidance devices; an actuator which imparts a driving force so that the transport table is transported; a control unit which performs transport control by feedback control during transport of the workpiece by the actuator; and a calculation unit which calculates a transport load applied from the workpiece to the moving member of each of the one or a plurality of motion guidance devices, wherein the control unit adjusts a control gain related to the feedback control in the transport control on the basis of the transport load in each of the one or a plurality of motion guidance devices as calculated by the calculation unit.

The workpiece transport control system according to the present invention is a system which includes a motion guidance device having a track member and a moving member and which further includes a calculation unit for calculating a transport load acting on each moving member from a workpiece. The transport load which acts on each moving member and which is calculated by the calculation unit is related to a control gain suitable for transport control. Therefore, by adjusting the control gain on the basis of the transport load which acts on each moving member from the workpiece, a control gain suitable for the workpiece at that moment can be set.

Since calculating a transport load in each moving member as described above eliminates the need to separately prepare a sensor for measuring a mass of the workpiece itself, downsizing of an apparatus can be achieved. Furthermore, since a control gain is adjusted in accordance with the transport load, a reduction in transport time can be achieved.

Advantageous Effects of Invention

A control gain in feedback control can be suitably set while suppressing an increase in apparatus size.

BRIEF DESCRIPTION OF DRAWINGS

FIG. 1 is a diagram showing a schematic configuration of a system according to the present embodiment.

FIG. 2 is a diagram showing a correlation between a motion guidance device and a driving driver unit.

FIG. 3 is an external perspective view of a motion guidance device according to the present embodiment.

FIG. 4 is a diagram showing an outline of an internal structure of the motion guidance device according to the present embodiment.

FIGS. 5(a) and 5(b) is a front view of a motion guidance device as viewed from a longitudinal direction of a rail, and FIG. 5 (b) is an enlarged view of a part B.

FIG. 6 is a block diagram of feedback control.

FIG. 7 is a flow chart showing a setting flow of a control gain.

FIG. 8 is a diagram showing a change in outputs of sensors when an external force acts on a carriage.

FIG. 9 is a diagram showing a portion with which balls are in contact inside a carriage.

FIG. 10 is a diagram showing a state of an internal load prior to generation of five displacement components.

FIG. 11 is a diagram showing a state of an internal load after the generation of five displacement components.

FIG. 12 is a diagram showing a schematic configuration of a system according to the present embodiment.

FIG. 13 is a flow chart showing a setting flow of a control gain.

DESCRIPTION OF EMBODIMENTS

Hereinafter, specific embodiments of the present invention will be described with reference to the drawings. It is to be understood that dimensions, materials, shapes, relative arrangements, and the like of components described in the embodiments are not intended to limit the technical scope of the invention thereto unless otherwise noted.

First Embodiment

FIG. 1 is a diagram showing a schematic configuration of a system according to the present embodiment. The system according to the present embodiment includes an apparatus unit 20 and a driving driver unit 30. The apparatus unit 20 includes: a motion guidance device 1 for supporting a workpiece; a transport table 8 which is a table on which the workpiece is to be placed, the transport table 8 being supported by the motion guidance device 1; an actuator (servo motor) 5 which imparts a driving force so that the transport table 8 is transported; a linear encoder 4 which detects a position of a moving member; and displacement sensors 2 and 3 which detect a displacement of the motion guidance device 1. It should be noted that the displacement sensors 2 and 3 are provided in plurality, and reference characters 2a to 2d and 3a to 3d represent the displacement sensors. In the specification of the present application, when individually expressing a displacement sensor, an alphabetical character for identifying each individual displacement sensor will be described after the reference numeral 2 or 3, but when collectively expressing the displacement sensors, only the reference numerals 2 and 3 will be described.

The apparatus unit 20 is electrically connected to the driving driver unit 30 so that displacement information on the basis of detected values of the displacement sensors 2 and 3, positional information on the basis of a detected value of the linear encoder 4, and the like can be transmitted to the driving driver unit 30. The driving driver unit 30 processes signals from each sensor and, at the same time, performs feedback control of the actuator 5. Furthermore, the driving driver unit 30 sets a control gain that is used when performing feedback control of the actuator 5. The driving driver unit 30 is electrically connected to the actuator 5, and the driving driver unit 30 supplies a driving current to the actuator to perform feedback control of the actuator 5.

A structure of the motion guidance device 1 and a flow of information and the like on the basis of detected values of displacement sensors 2 and 3 which are mounted to the motion guidance device 1 will now be described with reference to FIGS. 2 to 5. First, a configuration of the motion guidance device 1 will be described. The motion guidance device 1 includes a rail 11 (an example of a "track member" as described in the present application), and two carriages 12a and 12b (an example of a "moving member" as described in the present application) which are assembled so as to be relatively movable along a longitudinal direction of the rail 11. It should be noted that, in the specification of the present application, when individually expressing a carriage, an alphabetical character for identifying each individual carriage will be described after the reference numeral 12, but when collectively expressing the carriages, only the reference numeral 12 will be described.

In the present embodiment, the rail 11 is mounted to a base 7 and the transport table 8 is mounted to the carriage 12. A direction of movement of a movable part including the transport table 8 is guided by the motion guidance device 1. It should be noted that the motion guidance device 1 can be vertically flipped and have the carriage 12 mounted to the base 7 and the rail 11 mounted to the transport table 8. In addition, the motion guidance device 1 may be used in a state where the longitudinal direction of the rail 11 is inclined or perpendicular with respect to a horizontal plane instead of being horizontal. The carriage 12 can be provided in plurality or only one carriage 12 can be provided along the rail 11. In a similar manner, two or more motion guidance devices 1 can be provided.

FIG. 3 shows an external perspective view of the motion guidance device 1. For the purpose of illustration, the configuration of the motion guidance device 1 will be described on the assumption that the rail 11 is arranged on a horizontal plane, a direction viewed from the longitudinal direction of the rail 11 or, in other words, an x axis shown in FIG. 3 is a front-back direction, a y axis shown in FIG. 3 is a vertical direction, and a z axis shown in FIG. 3 is a horizontal direction. It is needless to say that arrangements of the motion guidance device 1 are not limited to this arrangement.

Two (upper and lower) band-like rolling surfaces 11a are provided on each of left and right sides of the rail 11. The rolling surface 11a has an arc-like cross section. Through-holes 1ib through which a fastening member for fastening the rail 11 to the base 7 is passed are provided at an appropriate pitch along the longitudinal direction on an upper surface of the rail 11.

The carriage 12 has a C-shaped cross section constituted by a horizontal part 12-1 which opposes the upper surface of the rail 11 and a pair of side parts 12-2 which oppose side surfaces of the rail 11. The carriage 12 includes a carriage main body 13 at center in a movement direction, a pair of lid members 14a and 14b arranged at both ends in a movement direction of the carriage main body 13, and a pair of sensor mounting members 15a and 15b (refer to FIG. 2) arranged at both ends in a movement direction of the pair of lid members 14a and 14b. The lid members 14a and 14b have a C-shaped cross section constituted by a horizontal part 14-1 which opposes the upper surface of the rail 11 and a pair of side parts 14-2 which oppose the side surfaces of the rail 11. The sensor mounting members 15a and 15b similarly have a C-shaped cross section constituted by a horizontal part 15-1 which opposes the upper surface of the rail 11 and a pair of side parts 15-2 which oppose the side surfaces of the rail 11 (refer to FIG. 5(a)). The lid members 14a and 14b are fastened to the carriage main body 13 by fastening members such as bolts. The sensor mounting members 15a and 15b are fastened to the carriage main body 13 and the lid members 14a and 14b by fastening members such as bolts. It should be noted that the sensor mounting members 15a and 15b have been omitted in FIGS. 3 and 4.

FIG. 4 is a diagram showing an outline of an internal structure of the motion guidance device 1. As shown in FIG. 4, the carriage main body 13 is provided with four band-like rolling surfaces 13a which oppose the four band-like rolling surfaces 11a of the rail 11. The carriage main body 13 is provided with a return path 13b which is parallel to each rolling surface 13a. The lid members 14a and 14b are provided with U-shaped turnaround paths 14c which connect each rolling surface 13a and each return path 13b to each other. An inner circumferential side of the turnaround path 14c is constituted by an inner circumferential part 13c which has a hemispherical cross section and which is integrated with the carriage main body 13. A track-like circulatory path is constituted by a load rolling path between the rolling surface 11a of the rail 11 and the rolling surface 13a of the carriage main body 13, the pair of turnaround paths 14c, and the return path 13b. The circulatory path houses a plurality of balls 16 (an example of "rolling elements" as described in the present application). When the carriage 12 relatively moves with respect to the rail 11, the balls 16 interposed between the rail 11 and the carriage 12 roll along the load rolling path. The balls 16 having rolled to one end of the load rolling path are introduced to one of the turnaround paths 14c, advance along the return path 13b and then the other turnaround path 14c, and return to another end of the load rolling path.

<Configuration of Sensor>

The displacement sensors 2 and 3 are, for example, capacitance type displacement meters and detect a displacement of the carriage 12 with respect to the rail 11 in a contact-less manner (refer to enlarged view of FIG. 5(b)). As shown in FIG. 2, the pair of sensor mounting members 15a and 15b are mounted to both ends of the carriage 12 in the movement direction. Four displacement sensors 2a to 2d are mounted to one sensor mounting member 15a. The four displacement sensors 2a to 2d are arranged at a same position in the longitudinal direction of the rail 11. Four displacement sensors 3a to 3d are similarly mounted to the other sensor mounting member 15b. The four displacement sensors 3a to 3d are arranged at a same position in the longitudinal direction of the rail 11. A distance between the displacement sensors 2a to 2d and the displacement sensors 3a to 3d in the longitudinal direction of the rail 11 is denoted by $L_1$ (refer to FIG. 2). Alternatively, the respective displacement sensors 2a to 2d and 3a to 3d can also be arranged in a staggered manner along the movement direction of the carriage 12.

FIG. 5(a) shows the sensor mounting member 15a as viewed from the longitudinal direction of the rail 11. As described above, the sensor mounting member 15a has the horizontal part 15-1 which opposes an upper surface 11c of the rail 11 and the pair of side parts 15-2 which oppose the left and right side surfaces of the rail 11. Two displacement sensors 2a and 2b which detect a displacement in a radial direction are arranged in the horizontal part 15-1. The displacement sensors 2a and 2b face each other across a gap on the upper surface 11c of the rail 11 and detect a gap to the upper surface 11c of the rail 11. A distance between the two displacement sensors 2a and 2b in the horizontal direction is denoted by $L_2$.

Two displacement sensors 2c and 2d which detect a displacement in the horizontal direction are arranged in the pair of side parts 15-2. The displacement sensors 2c and 2d face each other across a gap on a side surface 11d of the rail 11 and detect a gap to the side surface 11d.

In a state where the rail 11 is assumed to be arranged on a horizontal plane, the displacement sensors 2a and 2b and the displacement sensors 2c and 2d are arranged lower than an upper surface (a mounting surface) of the carriage 12. This arrangement is adopted in order to allow the transport table 8 to be mounted on the upper surface (the mounting surface) of the carriage 12. Cables $2a_1$ to $2d_1$ of the displacement sensors 2a to 2d are drawn out in the horizontal direction from the side part 15-2 of the sensor mounting member 15a. Alternatively, the cables $2a_1$ to $2d_1$ can be drawn out toward the front (in a direction perpendicular to a paper plane) from a front surface of the sensor mounting member 15a. In addition, a height of an upper surface of the sensor mounting member 15a can be set lower than the upper surface (the mounting surface) of the carriage 12 and a gap between the upper surface of the sensor mounting member 15a and the transport table 8 can be utilized as a gap for drawing out the cables $2a_1$ and $2b_1$.

In a similar manner to the sensor mounting member 15a, the sensor mounting member 15b shown in FIG. 2 has the horizontal part 15-1 and the pair of side parts 15-2, and the displacement sensors 3a to 3d are arranged at positions respectively corresponding to the displacement sensors 2a to 2d.

<Configuration of Linear Encoder>

The linear encoder 4 detects a position of any of the carriages 12 in an x axis direction. For example, the linear encoder 4 includes a scale which is mounted to the base 7 or the rail 11 and a head which is mounted to the transport table 8 or the carriage 12 and which reads the scale. It should be noted that position detecting means which detects a position of the carriage 12 on the rail 11 is not limited to a linear encoder. For example, when the transport table 8 is ball screw-driven, a rotary encoder which detects an angle of a motor for driving a ball screw can be used as the position detecting means.

<Functional Configuration of Driving Driver Unit 30>

The driving driver unit 30 includes an arithmetic processing device for processing and a memory for temporarily storing detected values of the displacement sensors 2 and 3 and the like, and various functions are exhibited when the arithmetic processing device executes a prescribed control program.

Displacement information of the carriage 12 which is detected values of the displacement sensors 2a to 2d and 3a to 3d and positional information of the carriage 12 are output to the driving driver unit 30 in each prescribed sampling period. The displacement sensors 2a to 2d and 3a to 3d detect an amount of displacement of the carriage 12 with respect to the rail 11. The amount of displacement of the carriage 12 with respect to the rail 11 represents a difference from a detected value of the displacement sensors 2a to 2d and 3a to 3d in an unloaded state where no load is applied to the carriage 12. The driving driver unit 30 considers, as the amount of displacement of the carriage 12 with respect to the rail 11, a value obtained by subtracting a detected value of the displacement sensors 2a to 2d and 3a to 3d in an unloaded state and stored in advance from the value of the displacement information detected by the displacement sensors 2a to 2d and 3a to 3d.

<Feedback Control>

The driving driver unit 30 sets a control gain that is used in feedback control. Feedback control of the actuator 5 according to the present embodiment will now be described.

FIG. 6 is a block diagram of feedback control of the actuator 5. Control blocks are roughly divided three ways into a position control calculation unit 101, a speed control calculation unit 102, and a current control calculation unit 103 and adopt a triple loop configuration having respective feedback loops. It should be noted that the feedback control related to the actuator 5 need not necessarily be executed with respect to position control, speed control, and current control, and feedback control need only be executed in at least one of the controls (for example, position control). First, a position deviation that is a difference between a target position 104 and an actual position detected by the linear encoder 4 is input to the position control calculation unit 101. The position control calculation unit 101 outputs a value obtained by multiplying the position deviation by a position loop gain (Kp). In addition, a speed deviation that is a difference between an output of the position control calculation unit 101 and a speed obtained by differentiating, by a speed detection unit 105, positional information detected by the linear encoder 4 is input to the speed control calculation unit 102. The speed control calculation unit 102 outputs a value obtained by multiplying the speed deviation by a speed loop gain (Kv). The output of the speed control calculation unit 102 is to be a torque command. A difference between the torque command and a current signal output by a current detector that detects a current to the actuator 5 is input to the current control calculation unit 103 to be amplified via, for example, a power amplifier to a level for driving the actuator 5.

<Details of Driving Driver Unit 30>

A setting method of a control gain by the driving driver unit 30 will now be described. FIG. 7 is a flow chart showing a setting flow of a control gain according to the present embodiment. The process shown in FIG. 7 is a process that is repetitively executed by the driving driver unit 30 at prescribed time intervals. When calculating the amount of displacement of the carriage 12 with respect to the rail 11, the driving driver unit 30 first determines whether or not the carriage 12 is stationary on the basis of positional information of the carriage 12 detected by the linear encoder 4 (S101). Next, the driving driver unit 30 acquires an amount of displacement of the carriage 12 from the respective displacement sensors 2 and 3 (S102). Subsequently, on the basis of data of the amount of displacement of the carriage 12 acquired in step S102, the driving driver unit 30 calculates a load acting on the carriage 12 (S103). On the basis of the calculated load, the driving driver unit 30 sets a control gain that is used when performing feedback control of the actuator 5 (S104). Details of processes in the respective steps of the calculation process described above will now be provided.

<S101>

In S101, the driving driver unit 30 determines whether or not the carriage 12 is stationary. Whether or not the carriage 12 is stationary can be determined on the basis of positional information of the carriage 12 which is detected by the linear encoder 4. For example, the driving driver unit 30 determines that the carriage 12 is moving when the positional information of the carriage 12 which is detected by the linear encoder 4 changes in a time series but determines that the carriage 12 is stationary when the positional information does not change in a time series. In the present embodiment, a determination of whether or not the carriage 12 is stationary is made in S101 in order to set, in advance, a control gain in feedback control before the carriage 12 starts moving.

<S102>

In S102, the driving driver unit 30 acquires an amount of displacement of the carriage 12 from the respective displacement sensors 2a to 2d and 3a to 3d. Since a measured value of the respective displacement sensors 2a to 2d and 3a to 3d is a distance from the sensor to the rolling surface, the driving driver unit 30 uses a distance from the sensor to the rolling surface in an unloaded state where no load is applied to the carriage 12 as a reference and acquires a difference from the reference distance as an amount of displacement of the carriage 12. When a plurality of the carriages 12 are provided, an amount of displacement is acquired from the respective displacement sensors 2a to 2d and 3a to 3d for each carriage 12.

<S103>

Next, in S103, the driving driver unit 30 calculates a load acting on the carriage 12 on the basis of a displacement of the carriage 12. When calculating the load, the driving driver unit 30 first calculates five displacement components of the carriage 12 on the basis of an amount of displacement of the carriage 12 acquired from each of the displacement sensors 2a to 2d and 3a to 3d. Next, on the basis of the five displacement components, the driving driver unit 30 calculates a load acting on each of the plurality of balls 16 and a contact angle of each ball 16. Subsequently, on the basis of the load and the contact angle of each ball 16, the driving driver unit 30 calculates the load (five external force components) which acts on the carriage 12. Details of the three steps described above will be provided below.

<Step 1: Calculation of Five Displacement Components of Carriage>

As shown in FIG. 3, when x-y-z coordinate axes are set to the motion guidance device 1, loads that act on a coordinate origin of the x-y-z coordinate axes are $F_y$ denoting a radial load and $F_z$ denoting a horizontal load. The radial load is a load acting in a positive direction of they axis shown in FIG. 3 which is a direction in which the carriage 12 is pressed against the rail 11. The horizontal load is a load acting in positive and negative directions of the z axis shown in FIG. 3 which are directions in which the carriage 12 is laterally shifted with respect to the rail 11.

In addition, moments around the x-y-z coordinate axes are $M_a$ denoting a sum of pitching moments, $M_b$ denoting a sum of yawing moments, and $M_c$ denoting a sum of rolling moments. The radial load $F_y$, the pitching moment $M_a$, the rolling moment $M_c$, the horizontal load $F_z$, and the yawing moment $M_b$ act on the carriage 12 as external forces. When these five external force components act on the carriage 12, five displacement components respectively corresponding to the five external force components or, more specifically, a radial displacement $\alpha_1$ (mm), a pitch angle $\alpha_2$ (rad), a roll angle $\alpha_3$ (rad), a horizontal displacement $\alpha_4$ (mm), and a yaw angle $\alpha_5$ (rad) are generated on the carriage 12.

FIG. 8 shows a change in outputs of the displacement sensors 2a to 2d when external forces act on the carriage 12. In FIG. 8, arrows with diagonal hatchings indicate sensors of which an output changes and blank arrows indicate sensors of which an output does not change. When the radial load $F_y$ acts on the carriage 12, a gap in the vertical direction between the carriage 12 and the rail 11 changes in accordance with a magnitude of the radial load $F_y$. The displacement sensors 2a and 2b detect a change (a displacement) of the gap in the vertical direction. It should be noted that the displacement sensors 3a and 3b mounted to the sensor mounting member 15b (refer to FIG. 2) also detect a displacement in the vertical direction.

When the radial load $F_y$ acts on the carriage 12, for example, the radial displacement $\alpha_1$ of the carriage 12 is given by the following equation, where $A_1$ and $A_2$ denote displacements detected by the displacement sensors 2a and 2b and $A_3$ and $A_4$ denote displacements detected by the displacement sensors 3a and 3b.

$$\alpha_1 = (A_1 + A_2 + A_3 + A_4)/4 \qquad \text{(Math. 1)}$$

When the horizontal load $F_z$ acts on the carriage 12, the carriage 12 shifts laterally with respect to the rail 11, a gap in the horizontal direction between one of the side parts 12-2 of the carriage 12 and the rail 11 decreases, and a gap in the horizontal direction between the other side part 12-2 of the carriage 12 and the rail 11 increases. The displacement sensors 2c and 2d detect such a change (a displacement) of the gap in the horizontal direction. It should be noted that the displacement sensors 3c and 3d mounted to the sensor mounting member 15b (refer to FIG. 2) also detect a displacement in the horizontal direction. The horizontal displacement $\alpha_4$ of the carriage 12 is given by the following equation, where $B_1$ and $B_2$ denote displacements detected by the displacement sensors 2c and 2d and $B_3$ and $B_4$ denote displacements detected by the displacement sensors 3c and 3d.

$$\alpha_4 = (B_1 - B_2 + B_3 - B_4)/4 \quad \text{(Math. 2)}$$

When the pitching moment $M_a$ acts on the carriage 12, gaps between the displacement sensors 2a and 2b and the rail 11 increase and gaps between the displacement sensors 3a and 3b and the rail 11 decrease. Assuming that the pitch angle $\alpha_2$ is sufficiently small, for example, the pitch angle $\alpha_2$ (rad) is given by the following equation.

$$\alpha_2 = ((A_3 + A_4)/2 - (A_1 + A_2)/2)/L_1 \quad \text{(Math. 3)}$$

When the rolling moment $M_c$ acts on the carriage 12, gaps between the displacement sensors 2a and 3a and the rail 11 decrease and gaps between the displacement sensors 2b and 3b and the rail 11 increase. Assuming that the roll angle $\alpha_3$ is sufficiently small, for example, the roll angle $\alpha_3$ (rad) is given by the following equation.

$$\alpha_3 = ((A_1 + A_3)/2 - (A_2 + A_4)/2)/L_2 \quad \text{(Math. 4)}$$

When the yawing moment $M_b$ acts on the carriage 12, gaps between the displacement sensors 2c and 3d and the rail 11 decrease and gaps between the displacement sensors 2d and 3c and the rail 11 increase. Assuming that the yaw angle $\alpha_5$ is sufficiently small, for example, the yaw angle $\alpha_5$ (rad) is given by the following equation.

$$\alpha_5 = ((A_1 + A_4)/2 - (A_2 + A_3)/2)/L_2 \quad \text{(Math. 5)}$$

As described above, the five displacement components of the carriage 12 can be calculated on the basis of displacements detected by the displacement sensors 2a to 2d and 3a to 3d.

<Step 2: Calculation of Acting Loads and Contact Angles of Each Ball>

FIG. 9 shows a state where a cross section in the x axis direction of a portion with which the balls 16 are in contact inside the carriage 12 has been taken. From FIG. 9, a pitch of the balls is denoted by $\kappa Da$ using $\kappa$ having a slightly larger value than 1 and an x coordinate of each ball is determined and denoted by $X_i$. $2U_x$ denotes a length of a portion in which the balls 16 roll inside the carriage 12. The number of balls that line up within $2U_x$ is referred to as the number of significant balls and is denoted by I. Curved surface machining with a large R-shape referred to as a crowning process is applied to both end portions of the carriage 12 so as to produce a radius of R and a depth of $\lambda_e$.

Theoretical formulas are formed on the assumption that five displacement components or, in other words, the radial displacement $\alpha_1$, the pitch angle $\alpha_2$, the roll angle $\alpha_3$, the horizontal displacement $\alpha_4$, and the yaw angle $\alpha_5$ are generated on the carriage 12 when the five external force components or, in other words, the radial load $F_j$, the pitching moment $M_a$, the rolling moment $M_c$, the horizontal load $F_z$, and the yawing moment $M_b$ act on the carriage 12.

FIG. 10 shows a state of an internal load before the five displacement components are generated and FIG. 11 shows a state of the internal load after the five displacement components are generated of a cross section in the carriage 12 at a ball number i of the carriage 12. In this case, a ball row number in the carriage 12 is denoted by j and a ball number in a ball row is denoted by i. $D_a$ denotes a ball diameter, f denotes a degree of conformance between the rolling surface and the ball 16 on both the side of the rail 11 and the side of the carriage 12, and, consequently, $fD_a$ denotes a radius of curvature of the rolling surface. In addition, $A_r$ denotes a center of curvature position of the rail-side rolling surface, $A_c$ denotes a center of curvature position of the carriage-side rolling surface, and $\gamma$ denotes an initial state of a contact angle that is an angle formed between a line connecting $A_r$ and $A_c$ and the z angle. Furthermore, $2U_{z12}$ denotes a ball-center distance between balls 16 which respectively roll on the two rolling surfaces on an upper side of the rail 11, $2U_{z34}$ denotes a ball-center distance between balls 16 which respectively roll on the two rolling surfaces on a lower side of the rail 11, and $2U_y$ denotes a ball-center distance between balls 16 which respectively roll on a rolling surface on the upper side of the rail 11 and a rolling surface on the lower side of the rail 11.

Precompression acts on the balls 16. First, a principle of precompression will be described. Dimensions of a portion sandwiched between opposing rolling surfaces of the rail 11 and the carriage 12 are determined by dimensions of the rail 11 and the carriage 12 at the time of design and by a geometric shape of the rolling surfaces. While a ball diameter that fits into the portion is a ball diameter at the time of design, when a ball 16 with a slightly larger dimension $Da+\lambda$ than the ball diameter at the time of design is assembled into the portion, according to Hertz's contact theory, the contact portion between the ball 16 and the rolling surface elastically deforms, forms a contact surface, and generates a contact stress. A load generated in this manner is an internal load that is a precompression load.

In FIG. 10, the load is denoted by $P_0$, and an amount of mutual approach between the rail 11 and the carriage 12 due to the elastic deformation of the contact portion is denoted by $\delta_0$. Although a ball position is actually at a center position between rolling surfaces of the rail 11 and the carriage 12 depicted by dashed-dotted lines in FIG. 10, since the degrees of conformance f between both rolling surfaces and the ball 16 are equal to each other, various characteristic values on the basis of Hertz's contact theory which are generated at the two contact portions of the ball 16 are the same. Therefore, the ball 16 is depicted by being moved to a position of the rail-side rolling surface in order to make the amount of mutual approach $\delta_0$ between the rolling surfaces of the rail 11 and the carriage 12 more readily understandable.

Normally, since the precompression load is defined as a radial direction load of two upper rows (or two lower rows) per one carriage, the precompression load $P_{pre}$ is expressed by the following equation.

$$P_{pre} = 2 \sum_{i=1}^{I} \sum_{j=1}^{2} P_{0i} \sin \gamma_j \quad \text{(Math. 6)}$$

Next, a state where the five external force components have acted on the motion guidance device 1 from the state described above and the five displacement components have been generated will be described. As shown in FIG. 11, due to the five displacement components including the radial displacement $\alpha_1$, the pitch angle $\alpha_2$, the roll angle $\alpha_3$, the horizontal displacement $\alpha_4$, and the yaw angle $\alpha_5$ at a center of the motion guidance device 1 which is used as the coordinate origin, a relative displacement of the rail 11 and the carriage 12 has occurred at an i-th ball position.

At this point, while the center of curvature of the rail-side rolling surface does not move, since the carriage 12 moves, the center of curvature of the carriage-side rolling surface geometrically moves at each ball position. This situation is expressed as a movement of $A_c$ denoting the center of curvature of the carriage-side rolling surface to $A_c'$. When an amount of movement from $A_c$ to $A_c'$ is considered separately in the y direction and the z direction, an amount of movement in the y direction is denoted by $\delta_y$, an amount of movement in the z direction is denoted by $\delta_z$, and subsequent suffixes denote an i-th ball and a j-th ball row, the amounts of movement can be expressed as $$\delta_{yij} = \alpha_1 + \alpha_2 x_i + \alpha_3 z_{cij}$$

$$\delta_{zij} = \alpha_4 + \alpha_5 x_i - \alpha_3 y_{cij}, \quad \text{(Math. 7)}$$

where $z_c$ and $y_c$ denote coordinates of a point $A_c$.

Next, since a line connecting centers of curvature of rolling surfaces on the side of the rail 11 and the side of the carriage 12 forms a contact angle that is a normal direction of a ball load, an initial contact angle $\gamma_j$ changes to $\beta_{ij}$ and, furthermore, a distance between the centers of curvature of both rolling surfaces changes from an initial distance between $A_r$ and $A_c$ to a distance between $A_r$ and $A_c'$. This change in the distance between the centers of curvature of both rolling surfaces is manifested as an elastic deformation in both contact portions of the ball 16 and, in a similar manner to the description of FIG. 10, an amount of elastic deformation $\delta_{ij}$ of the ball 16 is determined by depicting the ball 16 as being shifted to a position of the rail-side rolling surface.

When the distance between Ar and $A_c'$ is similarly considered separately in the y direction and the z direction, the distance in the y direction is denoted by $V_y$, and the distance in the z direction is denoted by $V_z$, the distances can be expressed using $\delta_{yij}$ and $\delta_{zij}$ described earlier as follows.

$$V_{yij} = (2f-1)D_a \sin \gamma_j + \delta_{yij}$$

$$V_{zij} = (2f-1)D_a \cos \gamma_j + \delta_{zij} \quad \text{(Math. 8)}$$

Accordingly, the distance between Ar and Ac' is expressed as $$\overline{ArAc'} = (V_{yij}^2 + V_{zij}^2)^{1/2} \quad \text{(Math. 9)}$$

and the contact angle $\beta_{ij}$ is expressed as $$\tan\beta_{ij} = \frac{V_{yij}}{V_{zij}} \quad \text{(Math. 10)}$$

As a result, the amount of elastic deformation $\delta_{ij}$ of the ball 16 is expressed as $$\delta_{ij} = (V_{yij}^2 + V_{zij}^2)^{1/2} - (2f-1)D_a + \lambda - \lambda_{xi} \quad \text{(Math. 11)}$$

In the state shown in FIG. 9 where a cross section in the x axis direction of a portion with which the balls 16 are in contact inside the carriage 12 has been taken, since Ac' being the center of curvature of the rolling surface on the side of the carriage 12 has separated from $A_c$ being the center of curvature of the rail-side rolling surface, the amount of elastic deformation $\delta_{ij}$ of the ball 16 in the machined portion subjected to crowning has decreased by an amount corresponding to the separation. Since the separation can be regarded as being equivalent to a case where the ball diameter is reduced accordingly, the amount is denoted by $\lambda_{xi}$ and subtracted in the equation given above.

Using a formula expressing an amount of elastic approach in a case where a rolling element is a ball as derived from Hertz's contact theory, a rolling element load $P_{ij}$ is obtained from the amount of elastic deformation $\delta_{ij}$ by the following equation.

$$P_{ij} = C_b \delta_{ij}^{3/2} \quad \text{(Math. 12)}$$

where $C_b$ denotes a nonlinear spring constant (N/mm$^{3/2}$) which is given by the following equation.

$$Cb = 2^{-\frac{3}{2}} \left(\frac{2K}{\pi\mu}\right)^{-\frac{3}{2}} \left[\frac{1}{8}\left\{\frac{3}{E}\left(1 - \frac{1}{m^2}\right)\right\}^2 \sum \rho \right]^{-\frac{1}{2}}, \quad \text{(Math. 13)}$$

where E denotes a longitudinal elastic modulus, 1/m denotes Poisson's ratio, 2K/$\lambda\mu$ denotes the Hertz coefficient, and $\Sigma\rho$ denotes a sum of principal curvatures.

According to the above, the contact angle $\beta_{ij}$ the amount of elastic deformation $\delta_{ij}$, and the rolling element load $P_{ij}$ can be expressed by equations with respect to all of the balls 16 in the carriage 12 using the five displacement components $\alpha_1$ to $\alpha_5$ of the carriage 12.

It should be noted that, in the description given above, a rigid body model load distribution theory in which the carriage 12 is considered a rigid body is used for the sake of brevity. The rigid body model load distribution theory can be expanded and a carriage beam model load distribution theory to which a beam theory has been applied in order to take the deformation of the side part 12-2 of the carriage 12 into consideration can also be used. Furthermore, a carriage-rail FEM model load distribution theory in which the carriage 12 and the rail 11 are considered FEM models can also be used.

<Step 3: Calculation of load (five external force components)>

Subsequently, equilibrium condition formulas with respect to the five components as external forces or, in other words, the radial load $F_y$, the pitching moment $M_a$, the rolling moment $M_c$, the horizontal load $F_z$, and the yawing moment $M_b$ need only be set using the equations presented above.

With respect to the radial load $F_y$, (Math. 14)

$$F_y = \sum_{j=1}^{4} \sum_{i=1}^{I} P_{ij} \sin\beta_{ij}$$

With respect to the pitching moment $M_a$, (Math. 15)

$$M_a = \sum_{j=1}^{4} \sum_{i=1}^{I} P_{ij} \sin\beta_{ij} x_{ij}$$

With respect to the rolling moment $M_c$, (Math. 16)

$$M_c = \sum_{j=1}^{4} \sum_{i=1}^{I} P_{ij} \omega_{ij}$$

where $\omega_{ij}$ denotes a length of a moment arm and is given by the following equation, where $z_r$ and $y_r$ denote coordinates of a point $A_r$.

$$\omega_{ij} = z_{rij}\sin\beta_{ij} - y_{rij}\cos\beta_{ij}$$

With respect to the horizontal load $F_z$, (Math. 17)

$$F_z = \sum_{j=1}^{4}\sum_{i=1}^{I} P_{ij}\cos\beta_{ij}$$

With respect to the yawing moment $M_b$, (Math. 18)

$$M_b = \sum_{j=1}^{4}\sum_{i=1}^{I} P_{ij}co\beta_{ij}x_i$$

Using the equations presented above, the load (the five external force components) acting on the carriage 12 can be calculated. It should be noted that, in the present embodiment, the driving driver unit 30 that processes S103 corresponds to the calculation unit according to the present invention.

<S104>

Next, in S104, the driving driver unit 30 sets a control gain on the basis of the load acting on the carriage 12. In this case, both a position loop gain Kp and a speed loop gain Kv are set. The driving driver unit 30 stores, as a map, a control gain corresponding to a total load of the workpiece as obtained from the load acting on each carriage 12. It should be noted that, instead of storing a map, a calculation formula for obtaining a control gain from the total load of the workpiece can be stored. The driving driver unit 30 calculates the total load of the workpiece on the basis of the load acting on each carriage 12 calculated in S103, and sets a control gain on the basis of the total load of the workpiece. For example, the control gain is set so that the larger the total load of the workpiece, the smaller the control gain. The driving driver unit 30 calculates, on the basis of the load acting on each carriage 12, the total load of the workpiece in accordance with a formula created in advance. Since an appropriate value of the control gain is related to the total load of the workpiece, in the present embodiment, a relationship between the control gain to be set and the total load of the workpiece is to be obtained in advance by an experiment, a simulation, or the like.

The control gain set in S104 is set when the carriage 12 is stationary. In addition, the control gain set immediately prior to the carriage 12 being driven for the first time is to be the control gain when controlling the actuator 5. While the process shown in FIG. 7 is repetitively executed at prescribed time intervals, alternatively, the process may be executed when it is determined that the total load of the workpiece has changed. In other words, a control gain corresponding to the total load of the workpiece after a change thereof may be set after the change of the total load of the workpiece and before driving the workpiece by the actuator 5 for the first time. In the present embodiment, the driving driver unit 30 that processes S104 corresponds to the output unit according to the present invention.

As described above, a total load of the workpiece can be obtained by detecting an amount of displacement of the carriage 12. In addition, by setting a control gain of the actuator 5 in accordance with the total load of the workpiece, an appropriate control gain with respect to the workpiece at this point can be set. Therefore, a transport time of the workpiece can be reduced. Furthermore, since a load can be detected on the basis of an amount of displacement of the carriage 12, for example, there is no need to measure a mass of the workpiece by separately providing a large apparatus such as a load cell. Therefore, downsizing of the system can be realized. Moreover, since the total load of the workpiece can be calculated regardless of a type of the workpiece, even with a line that handles workpieces of a plurality of types, an appropriate control gain can be set with respect to each workpiece. In addition, since a control gain can be set in a state where the carriage 12 is stationary, for example, the actuator 5 need not be actually activated as when a control gain is adjusted by automatic adjustment. This also enables the transport time of the workpiece to be reduced. Furthermore, since a displacement of the carriage 12 can be measured in a contact-less manner, for example, a load rating can be significantly increased as compared to a load cell. Therefore, workpieces with various masses can be accommodated.

While the motion guidance device 1 is in a state of being installed on the base 7 in the description given above, alternatively, the motion guidance device 1 may be in a state of being installed besides the base 7 or below the base 7. In other words, since a load acting on the carriage 12 can be calculated on the basis of a displacement of the carriage 12 even in a state where the motion guidance device 1 is hung on a wall (a state where the rail 11 extends in a vertical direction) and in a state where the motion guidance device 1 is suspended from a ceiling (a state where the rail 11 is mounted on the ceiling and the carriage 12 moves below the rail 11), a total load of the workpiece can be calculated. Therefore, an appropriate control gain can be set regardless of an orientation of the motion guidance device 1.

In addition, in the present embodiment, while a control gain is set on the basis of an amount of displacement of the carriage 12 while the carriage 12 is stationary, alternatively, a control gain can be set on the basis of an amount of displacement of the carriage 12 while the carriage 12 is moving. In other words, a load acting on the carriage 12 can be calculated even when the carriage 12 is moving and, since the load acting on the carriage 12 and a total load of a workpiece are correlated with each other, the total load of the workpiece can be calculated on the basis of the amount of displacement of the carriage 12. Furthermore, even when the carriage 12 is moving, a control gain can be set on the basis of the total load of the workpiece.

In addition, while the driving driver unit 30 calculates a load acting on the carriage 12 in the present embodiment, alternatively, the motion guidance device 1 may be configured to calculate a load acting on the carriage 12. Furthermore, the load calculated by the motion guidance device 1 may be output to the driving driver unit 30 to have the driving driver unit 30 calculate a control gain. In addition, the motion guidance device 1 may calculate a load acting on the carriage 12 and a control gain. Furthermore, the load and the control gain calculated by the motion guidance device 1 may be output to the driving driver unit 30 to have the driving driver unit 30 perform feedback control of the actuator 5 using the control gain. It can be considered that the motion guidance device 1 in this case includes the calculation unit and the output unit according to the present invention.

Second Embodiment

FIG. 12 is a diagram showing a schematic configuration of a system according to the present embodiment. In the first embodiment, the apparatus unit 20 includes one each of the motion guidance device 1 and the actuator 5, and the driving driver unit 30 performs feedback control of the one actuator 5. On the other hand, in the present embodiment, the apparatus unit 20 includes two each of the motion guidance device and the actuator, and the driving driver unit 30 performs feedback control of the two actuators 5. In addition, each control gain when performing food back control of each actuator 5 is set to a value corresponding to a load distribution or a center of gravity position of a workpiece. It should be noted that the center of gravity position of the workpiece can be obtained on the basis of the load distribution of the workpiece. A formula for obtaining a center of gravity position from a load distribution of a workpiece is to be created in advance.

In the present embodiment, a first motion guidance device 1a and a second motion guidance device 1b are provided as motion guidance devices and a first actuator 5a and a second actuator 5b are provided as actuators. The first motion guidance device 1a includes a first rail 111 (an example of a "track member" as described in the present application), and two carriages 12a and 12b (an example of a "moving member" as described in the present application) which are assembled so as to be relatively movable along a longitudinal direction of the first rail 111. The second motion guidance device 1b includes a second rail 112 (an example of a "track member" as described in the present application), and two carriages 12c and 12d (an example of a "moving member" as described in the present application) which are assembled so as to be relatively movable along a longitudinal direction of the second rail 112. The first actuator 5a drives the two carriages 12a and 12b on the first rail 111, and the second actuator 5b drives the two carriages 12c and 12d on the second rail 112. A common transport table 8 is mounted above the four carriages 12a to 12d. Therefore, the transport table 8 is supported by the four carriages 12a to 12d. Since a structure of each of the carriages 12a to 12d is the same as that of the carriage 12 according to the first embodiment, a description thereof will be omitted. In the present embodiment, a workpiece is simultaneously transported by the first actuator 5a and the second actuator 5b.

In the present embodiment, the driving driver unit 30 similarly calculates a load acting on each of the carriages 12a to 12d on the basis of an amount of displacement of each of the carriages 12a to 12d. Since a calculation method of the load acting on each of the carriages 12a to 12d is the same as in the first embodiment, a description thereof will be omitted. In addition, in the present embodiment, a load distribution or a center of gravity position of a workpiece is calculated on the basis of the load acting on each of the carriages 12a to 12d, and each control gain when performing feedback control of the first actuator 5a and the second actuator 5b is set on the basis of the load distribution or the center of gravity position of the workpiece.

FIG. 13 is a flow chart showing a setting flow of a control gain according to the present embodiment. The process shown in FIG. 13 is a process that is repetitively executed by the driving driver unit 30 at prescribed time intervals. It should be noted that, instead of repetitively executing the process shown in FIG. 13 at prescribed time intervals, the process may be executed after making a determination that the load distribution of the workpiece has changed but before driving the carriage 12 by the actuators 5 for the first time.

<S201>

In S201, the driving driver unit 30 determines whether or not the carriage 12 is stationary. In S201, the driving driver unit 30 determines whether or not the carriage 12 is stationary by a process similar to that of S101.

<S202>

In S202, the driving driver unit 30 acquires an amount of displacement of each of the carriages 12a to 12d from the respective displacement sensors 2a to 2d and 3a to 3d. In S202, the driving driver unit 30 acquires an amount of displacement of each of the carriages 12a to 12d by a process similar to that of S102.

<S203>

In S203, the driving driver unit 30 calculates a load acting on each of the carriages 12a to 12d on the basis of the amount of displacement of each of the carriages 12a to 12d. In S203, the driving driver unit 30 calculates a load acting on each of the carriages 12a to 12d by a process similar to that of S103. In the present embodiment, the driving driver unit 30 that processes S203 corresponds to the calculating unit according to the present invention.

<S204>

In S204, the driving driver unit 30 calculates a load distribution or a center of gravity position of a workpiece on the basis of the load acting on each of the carriages 12a to 12d. The driving driver unit 30 calculates, on the basis of the load acting on each of the carriages 12a to 12d, the load distribution or the center of gravity position of the workpiece in accordance with a formula created in advance.

<S205>

In S205, the driving driver unit 30 sets a control gain on the basis of the load distribution or the center of gravity position of the workpiece calculated in S204. In this case, the position loop gain Kp and the speed loop gain Kv are set for each of the first actuator 5a and the second actuator 5b. The driving driver unit 30 stores, as a map, control gains (a first control gain and a second control gain) of the respective actuators 5a and 5b corresponding to the load distribution or the center of gravity position of the workpiece, and control gains are respectively set on the basis of the load distribution or the center of gravity position of the workpiece calculated in S203. Since an appropriate value of the control gain is related to the load distribution or the center of gravity position of the workpiece, in the present embodiment, a relationship between the control gain to be set and the load distribution or the center of gravity position of the workpiece is to be obtained in advance by an experiment, a simulation, or the like. In the present embodiment, the driving driver unit 30 that processes S204 corresponds to the output unit according to the present invention.

In this manner, the load distribution or the center of gravity position of a workpiece can be calculated on the basis of the amount of displacement of each of the carriages 12a to 12d when the carriages 12 are stationary. In addition, an appropriate control gain that corresponds to the load distribution or the center of gravity position can be set to each of the actuators 5a and 5b.

As described above, the load distribution or the center of gravity position of a workpiece can be obtained on the basis of the amount of displacement of each of the carriages 12a to 12d when the carriages 12 are stationary. In addition, by setting a control gain of each of the actuators 5a and 5b in accordance with the load distribution or the center of gravity position of the workpiece, an appropriate control gain can be set. Therefore, a transport time of the workpiece can be reduced. In addition, since a load is detected on the basis of the amount of displacement of the carriage 12, downsizing of the system can be realized. Furthermore, since the load distribution or the center of gravity position of the workpiece can be calculated regardless of a type of the workpiece, even with a line that handles workpieces of a plurality of types, an appropriate control gain can be set with respect to each workpiece. In addition, since a control gain can be set in a state where the carriage 12 is stationary, transport time can be reduced. Furthermore, an appropriate control gain can be set regardless of an orientation of the motion guidance device 1. In addition, even when the carriage 12 is moving, a control gain can be set on the basis of the load distribution or the center of gravity position of the workpiece. Furthermore, since the center of gravity position of the workpiece can be calculated on the basis of the amount of displacement of each carriage 12, the present embodiment can also be utilized when calculating a generated force distribution which is important in, for example, a drive system of a gantry.

REFERENCE SIGNS LIST

1 Motion guidance device
2a, 2b, 2c, 2d, 3a, 3b, 3c, 3d Sensor
4 Linear encoder
5 Actuator
8 Transport table
11 Rail
12 Carriage
15a, 15b Sensor mounting member
20 Apparatus unit
30 Driving driver unit

The invention claimed is:

1. A workpiece transport control system which transports a workpiece while movably supporting the workpiece using a motion guidance device having a track member which extends along a longitudinal direction and a moving member which is arranged so as to oppose the track member via a rolling element rollably arranged inside a rolling groove and which is relatively movable along the longitudinal direction of the track member, the workpiece transport control system comprising:

one or a plurality of motion guidance devices;
a transport table which is a table on which the workpiece is to be placed, the transport table being supported by the one or a plurality of motion guidance devices;
an actuator which imparts a driving force so that the transport table is transported;
a control unit which performs transport control by feedback control during transport of the workpiece by the actuator; and
a calculation unit which calculates a transport load applied from the workpiece to the moving member of each of the one or a plurality of motion guidance devices, wherein
the calculation unit calculates the transport load when the workpiece is stationary; and
the control unit adjusts a control gain related to the feedback control in the transport control in advance before the moving member starts moving, on the basis of the transport load in each of the one or a plurality of motion guidance devices as calculated by the calculation unit.

2. The workpiece transport control system according to claim 1, wherein
the control unit estimates a total load of the workpiece or a load distribution of the workpiece on the basis of the transport load in each of the one or a plurality of motion guidance devices as calculated by the calculation unit, and sets a gain value corresponding to the estimated total load of the workpiece or the estimated load distribution of the workpiece as the control gain.

3. The workpiece transport control system according to claim 2, wherein the control unit sets, when it is determined that the total load of the workpiece or the load distribution of the workpiece has changed on the basis of the transport load in each of the one or a plurality of motion guidance devices as calculated by the calculation unit, and before the workpiece is to be driven for the first time by the actuator after the change, a gain value corresponding to the total load of the workpiece or the load distribution of the workpiece after the change as the control gain.

4. The workpiece transport control system according to claim 1, wherein
each of the one or a plurality of motion guidance devices further includes a plurality of displacement sensors which detect a displacement of the moving member in a prescribed number of displacement directions in the moving member, and
the calculation unit calculates, for each of the one or a plurality of motion guidance devices, the transport load on the basis of detected values of the plurality of displacement sensors of each motion guidance device.

5. The workpiece transport control system according to claim 1, wherein
the actuator is a first actuator,
the workpiece transport control system further includes a second actuator that differs from the first actuator, the second actuator imparting a driving force together with the first actuator so that the transport table is transported,
the workpiece transport control system includes a plurality of the motion guidance device, and
the control unit performs transport control by feedback control in each actuator when the workpiece is simultaneously transported by the first actuator and the second actuator, and adjusts a first control gain related to the feedback control for the first actuator and a second control gain related to the feedback control for the second actuator in the transport control on the basis of the transport load in each of the plurality of motion guidance devices as calculated by the calculation unit.

6. The workpiece transport control system according to claim 5, wherein
the control unit estimates a load distribution of the workpiece in the transport table on the basis of the transport load in each of the plurality of motion guidance devices as calculated by the calculation unit, and sets the first control gain and the second control gain in correspondence to the estimated load distribution.

7. A motion guidance device having a track member which extends along a longitudinal direction and a moving member which is arranged so as to oppose the track member via a rolling element rollably arranged inside a rolling groove and which is relatively movable along the longitudinal direction of the track member, the motion guidance device comprising:

a plurality of displacement sensors which detect displacements of the moving member in a prescribed number of displacement directions of the moving member;
a calculation unit which calculates, on the basis of detected values of the plurality of displacement sensors, a transport load applied from the workpiece to the moving member; and
an output unit which generates and outputs, on the basis of the transport load, gain-related information that is related to a control gain for feedback control when transport of the workpiece is performed via the feedback control by an external control device while movably supporting the workpiece with the motion guidance device, the gain-related information being information to be used in an adjustment process of the control gain when a load of the workpiece changes,
wherein the calculation unit calculates the transport load when the workpiece is stationary; and
the control gain is set in advance before the moving member starts moving.

* * * * *